May 18, 1954  O. A. VASEK  2,679,036
FISHING LINE SIGNALING DEVICE
Filed Nov. 9, 1945  3 Sheets-Sheet 1
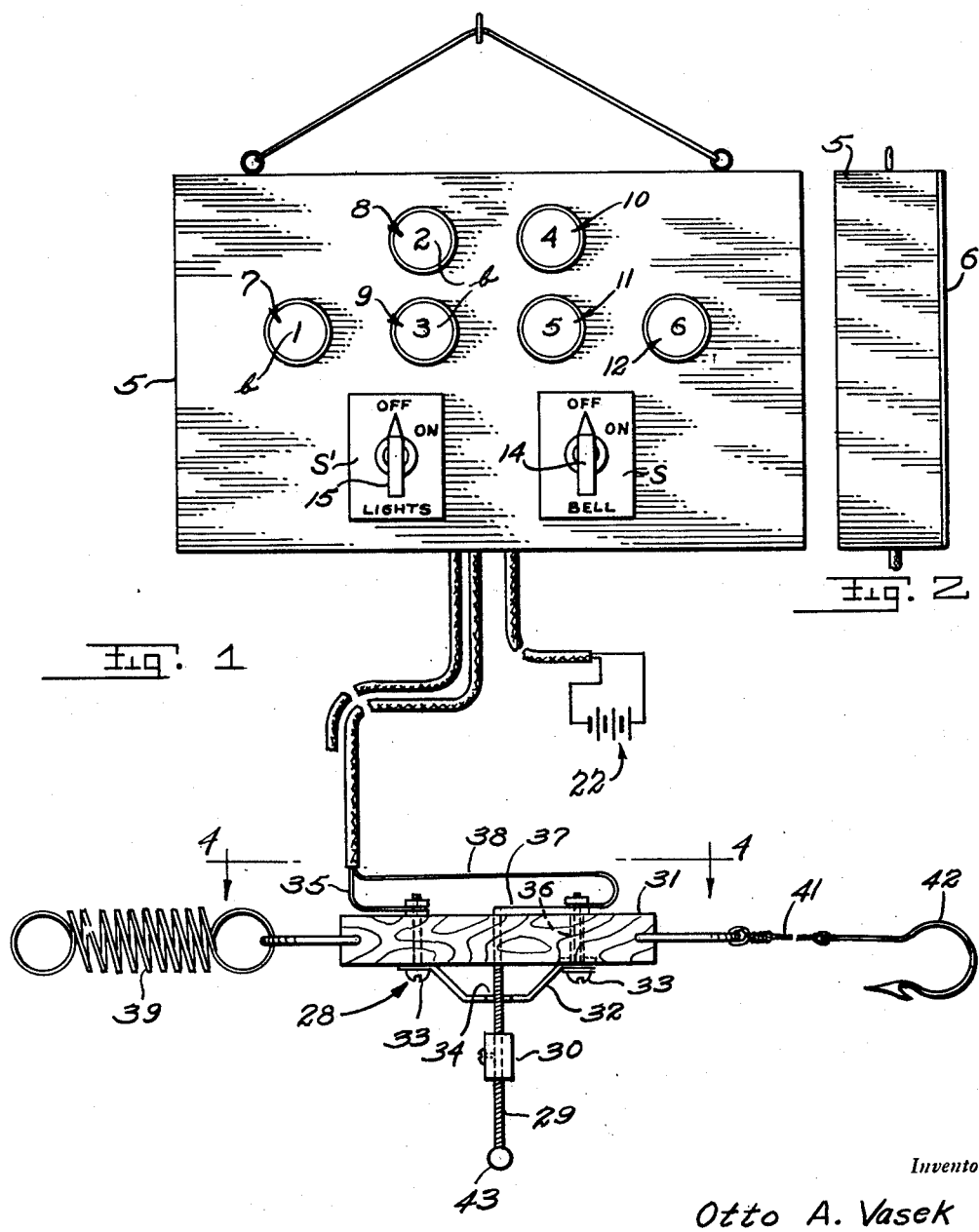
Inventor
Otto A. Vasek May 18, 1954   O. A. VASEK   2,679,036
FISHING LINE SIGNALING DEVICE
Filed Nov. 9, 1945   3 Sheets-Sheet 2

Inventor
Otto A. Vasek

By Clarence A. O'Brien
and Harvey B. Jacobson
Attorneys

May 18, 1954  O. A. VASEK  2,679,036
FISHING LINE SIGNALING DEVICE
Filed Nov. 9, 1945  3 Sheets-Sheet 3
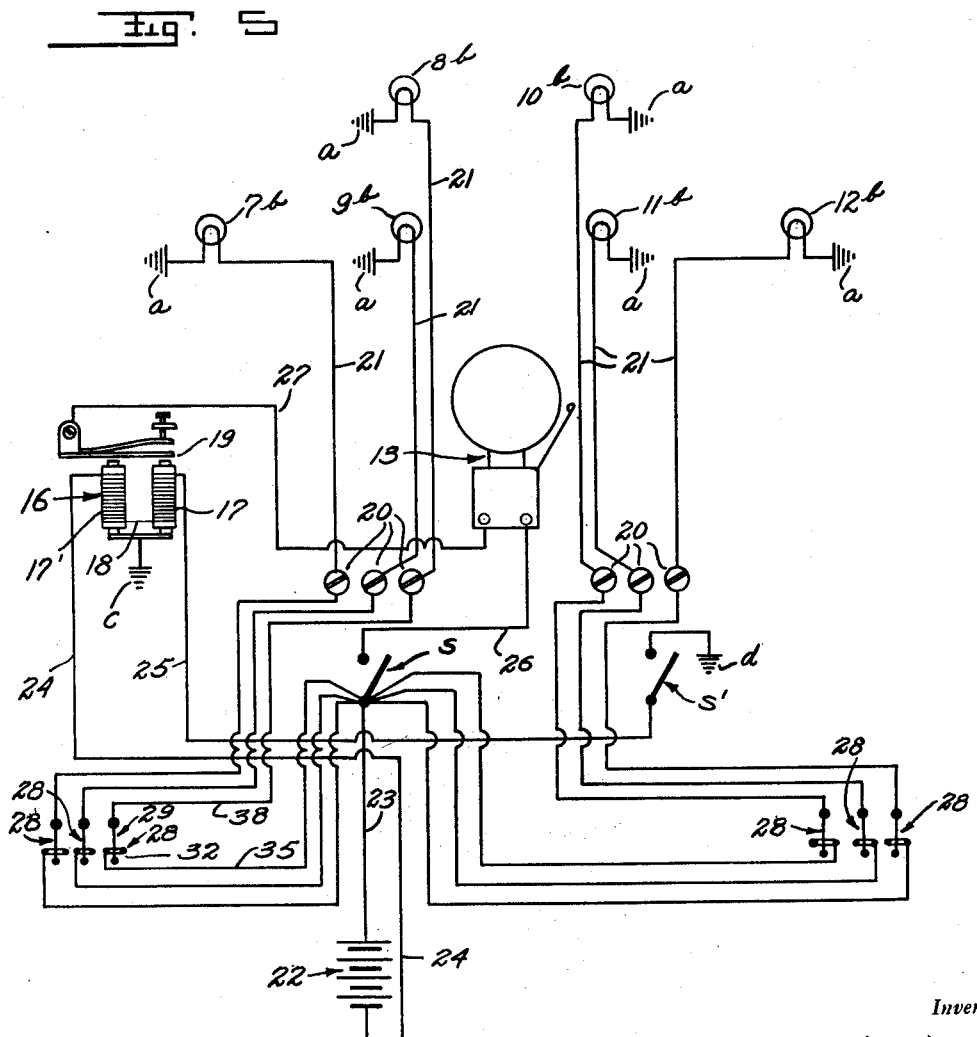
Inventor
Otto A. Vasek Patented May 18, 1954

2,679,036

UNITED STATES PATENT OFFICE 2,679,036

FISHING LINE SIGNALING DEVICE

Otto A. Vasek, Vancouver, British Columbia, Canada; Gordon Ferguson, executor of said Otto A. Vasek, deceased, assignor to Anton Vasek, New Westminster, British Columbia, Canada Application November 9, 1945, Serial No. 627,615

1 Claim. (Cl. 340—213)

This invention relates to an improved fishing line signalling device, and has more particular reference to an electrical device for warning a fisherman when the hook of his fishing line has been taken by a fish.

A further object is to provide a device of the above kind embodying means to indicate which one of a plurality of fishing lines has had its hook taken so that the fisherman may promptly attend to the proper line.

Another object is to provide a device of the above kind embodying an audible signal to warn the fisherman when the hook of any one of a plurality of lines has been taken, and visual signals to respectively indicate the particular line whose hook has been taken.

A more specific object of the invention is to provide a device of the above kind which is comparatively simple in construction, easy to place in use, and highly efficient in operation.

The exact nature of the present invention will become apparent from the following description when considered in connection with the accompanying drawings, in which:

Figure 1 is a front elevational view, partly broken away, of a fishing line signalling device constructed in accordance with the present invention, but with some duplicated parts of the device omitted for sake of simplicity.

Figure 2 is a side elevational view of the annunciator forming part of the device shown in Figure 1.

Figure 5 is a wiring diagram showing how the various electrical elements of the signalling device are connected for operation.

Figures 3, 4:
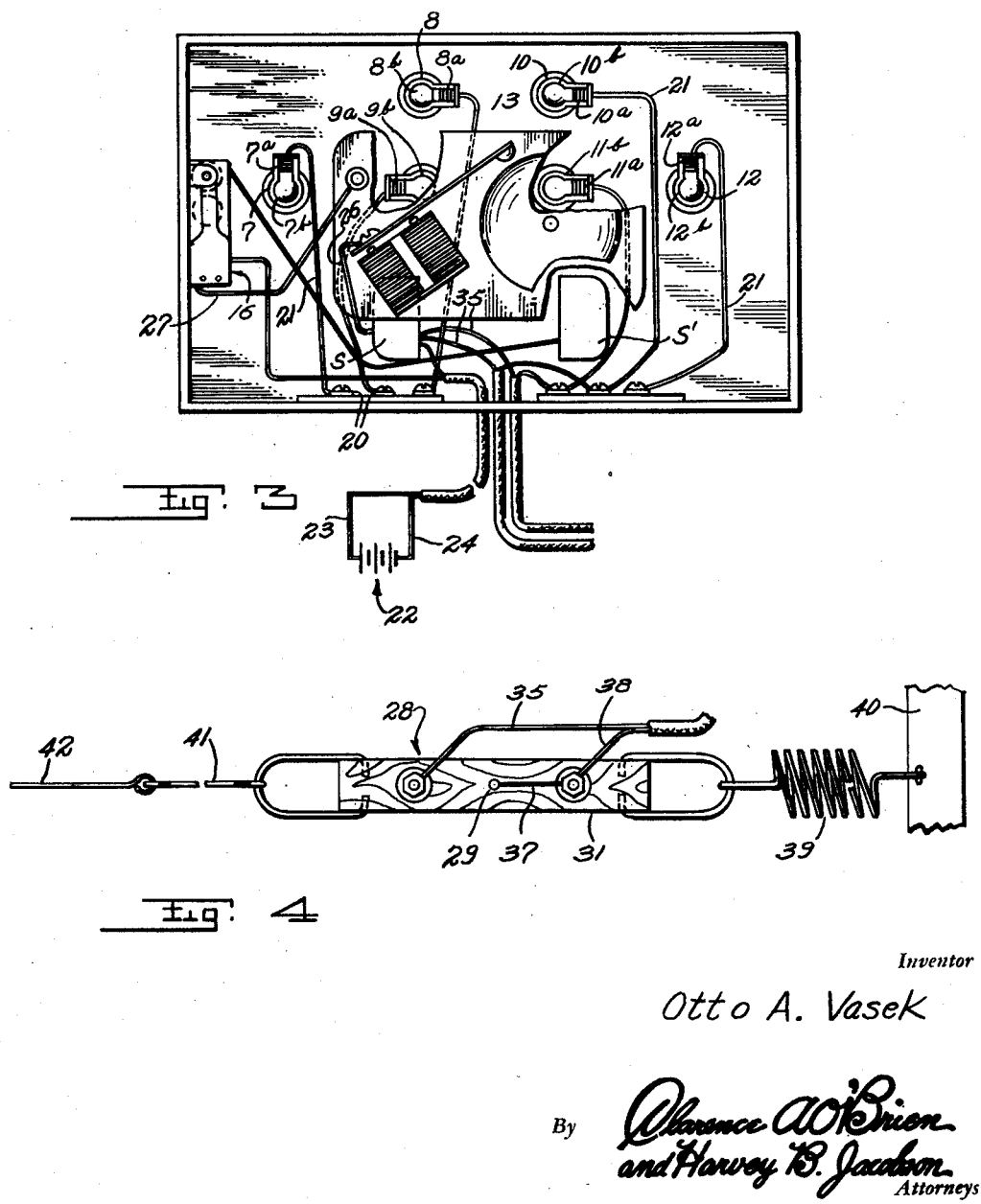
Figure 3 is a rear elevational view of the annunciator with the cover plate removed.
Figure 4 is a top plan view of the normally open switch forming part of the present device and which is shown in side elevation in Figure 1.

Referring in detail to the drawings, the present invention includes an annunciator embodying a flat casing 5 having a removable rear cover plate 6 and provided in its front wall with a plurality of windows 7, 8, 9, 10, 11 and 12. Lamp sockets 7a, 8a, 9a, 10a, 11a and 12a are mounted on the inner face of the front wall of casing 5 so as to have their threaded shells grounded to the casing as indicated at a in Figure 5. Lamps 7b, 8b, 9b, 10b, 11b and 12b are respectively mounted in the sockets 7a, 8a, 9a, 10a, 11a and 12a so as to be respectively registered with the windows 7, 8, 9, 10, 11 and 12. The signal lamps may be distinguished from each other by providing them with bulbs of different colors or by numbering the windows as indicated at b in Figure 1. An electrical bell 13 is also mounted in and insulated from the casing 5 in spaced relation to its front wall so as to leave space between the bell and the front wall of the casing to accommodate the lamps 9b and 11b together with their lamp sockets, as well as other parts to be presently described.

Mounted on the front wall of casing 5 between said wall and the bell 13 is a manually operable single throw switch S having an operating handle 14 exteriorly of the casing. Another single throw manually operable switch S' is similarly mounted and provided with an operating handle 15 exteriorly of the casing.

A normally open relay 16 is mounted on one end wall of and within the casing 5, and the cores of the magnets of this relay are grounded as indicated at c in Figure 5. The magnets of relay 16 include coils 17 and 17' which are connected in series at 18, and a resilient armature contact 19, attractable by the magnets of the relay into engagement with the cores thereof, is normally disengaged from said cores. Arranged within and carried by and insulated from the bottom wall of casing 5 are a plurality of binding posts 20, and the central contacts of the lamp sockets 7a, 8a, 9a, 10a, 11a, and 12a are connected to different ones of these binding posts by wires 21.

A suitably located battery 22 has its positive terminal connected by a wire 23 to one contact of switch S, and the negative terminal of the battery is connected by a wire 24 to the coil 17' of relay 16. The coil 17 of relay 16 is connected by a wire 25 to one contact of switch S', and the other contact of switch S is connected by a wire 26 to one binding post of the bell 13. The other binding post of bell 13 is connected by a wire 27 to the armature contact 19 of relay 16, and the other contact of switch S' is grounded to the casing 5 as indicated at b in Figure 5.

For each fishing line, there is provided a normally open switch 28 including a resilient contact 29 equipped with a weight 30 and flexible by the inertia of its weight to close the circuit of a visual signal or signal lamp in response to a jerk on the associated fishing line. Each switch 28 further includes an insulating block 31 having the ends of a U-shaped contact 32 bolted thereto as at 33. The contact 32 has a central opening 34 through which the flexible resilient contact 29 normally centrally extends so as to be out of engagement with the contact 32. The bolts at 33 constitute binding posts, one being in electrical connection with the contact 32 and being connected by a wire 35 with the input side of switch S. The other binding post 33 is insulated from the contact 32 as indicated at 36 in Figure 1, and connected by a conductor 37 with the flexible contact 29. The latter binding post is also connected by a wire 38 with one of the binding posts 20, it being noted that the insulated binding post 33 of each switch 28 is connected to a different one of the binding posts 20. Thus, each normally open switch 28 is interposed in the circuit of a different visual signal or signal lamp.

An elastic element or tension spring 39 is attached at one end to one end of the insulating block 31 and is adapted to be connected at its other end to a fixed support 40 on the fishing boat. Attached to the other end of the block 31 is the fishing line 41. Thus, when a fish takes the hook 42 of the line 41 and jerks on the line, the spring 39 yields so as to permit a sudden movement of the switch 28 in a direction transverse to the resilient contact 29 and, due to the inertia of the weight 30, the contact 29 is flexed into engagement with the wall of the opening 34 provided in contact 32, thereby closing the circuit of the visual signal or signal lamp with which the contact 29 is connected by wires 38 and 21. The weight 30 is adjustable longitudinally of the contact 29 so as to obtain most efficient action of the switch 28 according to the type of fishing being done. The contact 29 is preferably in the form of a slender helical spring having closely related coils or convolutions, and the free or lower end of contact 29 preferably has an enlargement or head 43 which acts as a stop and prevents passage of the weight 30 off of said contact 29 so that it may not become accidentally detached and lost.

The arrangement is such that by opening the switch S and closing the switch S', the device may be conditioned for only giving visual signals. For instance, if the switch 28 associated with a given fishing line is closed by a jerk on said line, the current will flow from the positive side of battery 22 through wire 23 to the input side of switch S, but the current cannot flow to bell 13 through wire 26 because switch S is open. The current will thus flow from wire 23 through the wire 35 connected with the closed switch 28, through the wire 38 connected with the latter switch, through the wire 21 connected with the said wire 38, through the lamp to which the said wire 21 is connected, from the ground a of said lamp to the ground d of switch S' through wire 25, coils 17 and 17' and wire 24 back to the negative side of battery 22. The lamp in the circuit thus traced will be lighted, thereby indicating the particular fishing line whose hook has been struck by the fish. Should the fisherman be occupied with other duties, he may have his attention called to the annunicator whenever the hook of a line is struck by a fish, by simply closing the switch S. When this is done, the current also flows from wire 23 through wire 26, the magnet coils of bell 13, the wire 27, the armature contact 19 to ground C, and then to ground d through wire 25, coils 17 and 17' and wire 24 to the negative side of the battery. The circuit of the bell 13 is thus closed so that the bell is rendered operative for giving an audible signal at the same time that the signal lamp is lighted. In this way, when it is not convenient to keep a constant watch on the annunicator, the bell will draw the fisherman's attention and warn him to look at the annunicator and determine which line has had its hook taken by a fish.

It is pointed out that the annunicator may be located some distance from the fishing lines where the switches 28 are provided. Thus, the annunicator may be placed inside the cabin or pilot compartment of the boat so that the fisherman may remain under cover in inclement weather except when actually casting a fishing line or pulling in a line after its hook has been struck by a fish. By using a device of this kind, loss of fish will be minimized due to lack of giving the lines prompt attention when the hooks thereof are struck by fish.

From the foregoing description, it is believed that the construction, operation and advantages of the present invention will be readily understood and appreciated by those skilled in the art. The invention is subject to modification and changes in details of construction such as fall within the spirit and scope of the invention as claimed.

What I claim is:

A signalling device for use with a plurality of fishing lines, comprising a casing having a plurality of signal lamps mounted therein, a circuit for each of said lamps including a normally open switch operatively connected to an individual one of said fishing lines, each of said switches being elastically mounted on a support, each normally open switch including a resilient, weighted contact flexible by the inertia of its weight to close the associated visual signal circuit in response to a jerk on the associated fishing line whereby an operator may readily determine which line has been struck by a fish, a common source of current for said visual signal circuits, a relay disposed in said casing having its winding connected serially with the common source circuit to said normally open switches, an audible signal circuit including a manually operable switch and a bell connected in series with the armature contact of said relay.

References Cited in the file of this patent

UNITED STATES PATENTS

| Number | Name | Date |
|---|---|---|
| 657,518 | Cook | Sept. 11, 1900 |
| 893,997 | Haas et al. | July 21, 1908 |
| 1,055,153 | Ferguson | Mar. 4, 1913 |
| 1,649,534 | Lawhon | Nov. 15, 1927 |
| 1,737,921 | Derr | Dec. 3, 1929 |
| 1,754,360 | Hendricks | Apr. 15, 1930 |
| 1,815,662 | Bacon | July 21, 1931 |
| 2,115,027 | Leonard | Apr. 26, 1938 |
| 2,128,899 | Barnhart | Sept. 6, 1938 |
| 2,198,677 | Mueller, Sr. | Sept. 25, 1945 |
| 2,385,707 | Johnson | Sept. 25, 1945 |

FOREIGN PATENTS

| Number | Country | Date |
|---|---|---|
| 1,704 | Great Britain | of 1900 |
| 592,549 | Germany | Feb. 6, 1931 |